United States Patent [19]

Varma et al.

[11] Patent Number: 4,929,939
[45] Date of Patent: May 29, 1990

[54] HIGH-SPEED SWITCHING SYSTEM WITH FLEXIBLE PROTOCOL CAPABILITY

[75] Inventors: Anujan M. Varma, Croton-On-Hudson; Christos J. Georgiou, White Plains, both of N.Y.

[73] Assignee: International Business Machines Corporation, Armonk, N.Y.

[21] Appl. No.: 264,596

[22] Filed: Oct. 31, 1988

[51] Int. Cl.[5] .................... H04Q 1/00; H03K 17/00
[52] U.S. Cl. .................... 340/825.800; 340/825.790; 379/272
[58] Field of Search .......... 340/825.8, 825.83, 825.79, 340/825.50; 370/16, 58; 379/272, 273, 279, 269

[56] References Cited

U.S. PATENT DOCUMENTS 4,554,483 11/1985 Pinede et al. .................... 379/272
4,630,045 12/1986 Georgiou .................... 340/825.79
4,706,150 11/1987 Lebizay et al. .................... 340/825.8
4,814,762 3/1989 Franaszek .................... 340/825.83

Primary Examiner—Donald J. Yusko
Assistant Examiner—Dervis Magistre
Attorney, Agent, or Firm—Whitham & Marhoefer

[57] ABSTRACT

The invention provides a crosspoint switching system (30) comprising a plurality of switching planes for transferring data therethrough. The switching planes are comprised of two types, data planes (32) used only for transferring data between processors and at least one control/data plane (34) capable of transferring data and controlling crosspoints in the other data planes. The switching system is operable with two protocols, a message-switched mode in which only the control/data plane is used for transfer of data and a circuit-switched mode in which the control/data plane and the other data planes are used for transfer of data.

16 Claims, 7 Drawing Sheets

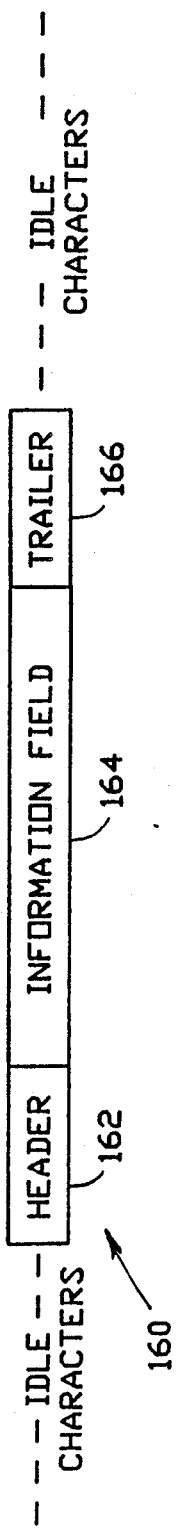
FIG.7A  FORMAT OF MESSAGE FRAME
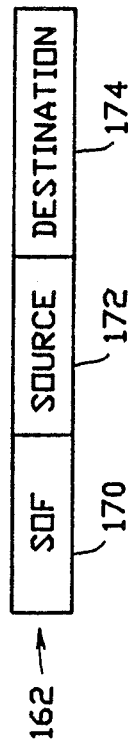
FIG.7B  FORMAT OF HEADER
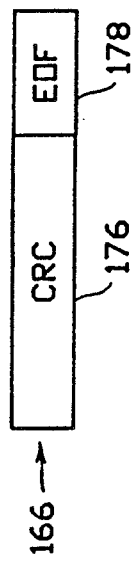
FIG.7C  FORMAT OF TRAILER

HIGH-SPEED SWITCHING SYSTEM WITH FLEXIBLE PROTOCOL CAPABILITY

BACKGROUND OF THE INVENTION

1. Field of the Invention

The present invention relates to cross-point switching networks and, in particular, to high-speed crosspoint switching systems for interconnecting high performance processors.

2. Description of the Prior Art

Multiprocessing has been recognized as a means of achieving computing speeds beyond what is possible with improvements in technology. One possible implementation of such a multiprocessor system is shown in FIG. 1. The system consists of N processors 10, each having its own memory. Some of the processors 10 are application processors which execute application programs for users, while some perform special functions such as input/output and system management. For high availability, the system is usually designed to tolerate the failure of one or more processors. The processors 10 are high performance computers, operating at 50 to 500 MIPs. The processors 10 in the multiprocessor system communicate with each other by sending messages via link adapters 12 over high speed fiber links 14 through a common switching system 16. The number n of links 14 between each processor 10 and the switch 16 depends on the desired communication bandwidth. Spare links, not shown in FIG. 1, can be provided for high availability.

The switch 16 provides each processor 10 the capability of sending messages to any other processor in the system by setting up connections dynamically. Such connections are established and terminated under certain protocols. Two of the most well known protocols are circuit-switching and message-switching. In circuit-switching, the sender first sends to the switch 16 a control message containing the address of the intended destination. The switch 16 then sets up a communication path between the two processors 10 and informs the sender. The sender then transmits the message and the connection is broken upon an acknowledgement from the destination that the data was received correctly. Under the message-switching protocol, the communication path is not established before sending the data. The message, which contains the address of the destination, is sent by the sender to the switch 16. The switch 16, upon receipt of the message, tries to set up a path to the destination and send the message. If successful, the message is sent to the destination and the connection is broken immediately after the end of transmission of the message. If the destination receives the message properly, it sends an acknowledgement to the sender through the switch 16 as a separate message. Since no communication path is already available when the message is received by the switch 16, buffers are provided in the switch 16 to store the message while a communication path to the destination is being set up.

Each of the above protocols is suited to a specific environment. Circuit-switching is favorable for long messages because the overhead for setting up the path initially becomes insignificant as compared to the actual time for transmitting the message across the links to the destination. Handling such messages by message-switching would require a large amount of buffering in the switch 16 and is therefore expensive. For short messages, however, circuit-switching performs poorly because the overhead for setting up the path becomes significant in comparison to the time for transmitting the message. This overhead includes the time for propagation of the control information from the sender to the switch 16 and receipt of a reply back, i.e., one round trip propagation delay in the fiber links 14. The fiber links 14 in a large data processing complex can be hundreds of meters long. At the rate of approximately 5 nanosecond per meter, the total round-trip delay can be a few microseconds. Message-switching eliminates this overhead. At the same time, the cost of buffering a short message in the switch is not prohibitive.

In the multiprocessor system shown in FIG. 1, the communication between processors 10 consists of both short and long messages. Short messages are used for such purposes as synchronization of processors 10 cooperating on a common task. The length of these messages is usually not more that 256 bytes. Long messages are associated with movement of pages of data between processors 10 or between a processor 10 and a shared storage device. The size of a page can be 4 kilobytes or more. These two types of messages pose different demands on the switch 16. Long messages require high bandwidth in the switch 16 to achieve fast transfer of data. The time overhead to set up the switch 16 under a circuit switching protocol is less significant because this is small in comparison to the transfer time. Short messages require only a lower bandwidth but are more sensitive to the set-up time. Therefore, to be able to support both types of communication efficiently, the switch 16 should be able to provide high bandwidth for long messages and low set-up time for short messages.

It is known to implement the switching system as multiple switching planes, each plane handling one fiber link per processor. Such a system is described in U.S. Pat. No. 4,695,999 issued to G. Lebizay. In this system, each switching plane is organized as an independent crosspoint switching system with its associated control circuitry for set-up. Each of the n links from a processor connects to a distinct switching plane. Variable bandwidth is achieved by using as many links as required during a specific transmission.

A switching system requires certain control information with each message to route the message to the proper destination. This includes the address of the destination where the message is to be sent, and the type of connection to be set up. When multiple switching planes are employed in the switching system, there are two ways of conveying this control information to the switch. The first is to treat each of the switching planes independently and send control information on every link of the sender preceding the data on that link. Each of the switching planes receives the control information and configures itself independent of the rest of the planes. This is the approach followed in U.S. Pat. No. 4,695,999. Alternately, one of the switching planes can be designated as the control plane and used exclusively for sending the control information. The switching planes are no longer independent, but are controlled simultaneously. Only one of the switching planes receives the control information, which then sets up all of the switching planes. Data can be sent through all of the links once the set-up is complete.

The approach of using independent switching planes, as described in U.S. Pat. No. 4,695,999, has some major drawbacks when applied to high-speed switching, typically at 1 gigabits/second and beyond. Hardware is required in each switching plane for processing the control information needed to make a connection. The incoming data arriving at a switching plane from the link is usually in coded form. One such code is the 8/10 code described in U.S. Pat. No. 4,665,517 issued to A. Widmer. This type of coding provides a number, of advantages, such as error detection, DC-balance and allowance for special control characters. Decoding of this data must be performed before control information can be extracted from it. This decoding involves the generation of a clock signal from the incoming data as well as conversion of the serial bitstream into parallel data words. The hardware to provide these functions at gigabit speeds is very costly. Additionally, buffers must be provided on each incoming link to hold the data while a connection request is waiting to be processed. This buffering at high speeds is very expensive to provide. Finally, each plane requires an independent controller which must be operated in synchronism with the other controllers to achieve the same set of connections in each plane.

SUMMARY OF THE INVENTION

Accordingly, an object of the invention is to provide a variable bandwidth crosspoint switching system without the high cost associated with the implementation disclosed in Lebizay U.S. Pat. No. 4,695,999.

Another object of the invention is to provide a multi-plane crosspoint switching system capable of transferring messages between processors by message-switched and circuit-switched protocols.

An additional object of the invention is to provide a high-speed multi-plane crosspoint switch of variable bandwidth for effective transfer of both short and long messages between the processors.

The invention provides a crosspoint switching system comprising a plurality of switching planes for transferring data between a plurality of processors. At least one of the switching planes is capable of controlling the data transfer therethrough and controlling the data transfer through the other switching planes. The switching system provides two protocols for communication between the processors, a first, message-switched mode in which only one switching plane is used for data transfer and a second, circuit-switched mode in which all of the switching planes are used for data transfer.

In a preferred embodiment of the invention, the switching planes are comprised of two types, data planes and control/data planes. The data planes are used solely for the purpose of transferring data and contain no hardware to extract control information from the messages or to determine the setting of the crosspoints in the switching plane. The control/data planes perform the dual functions of transferring data as well as setting up the switching planes based on control information extracted from the message. Short messages are switched through the control/data planes in the message-switched mode to achieve low latency. Long messages are transferred by distributing the data across all of the switching planes in the circuit-switched mode.

BRIEF DESCRIPTION OF THE DRAWINGS

The foregoing and other objects, aspects advantages and advantages of the invention will be better understood from the following detailed description of a preferred embodiment with reference to the drawings, in which:

FIGS. 7A to 7C illustrate the formats of a message frame, a header field and a trailer field, respectively.

DETAILED DESCRIPTION OF A PREFERRED EMBODIMENT OF THE INVENTION

Figure 1:
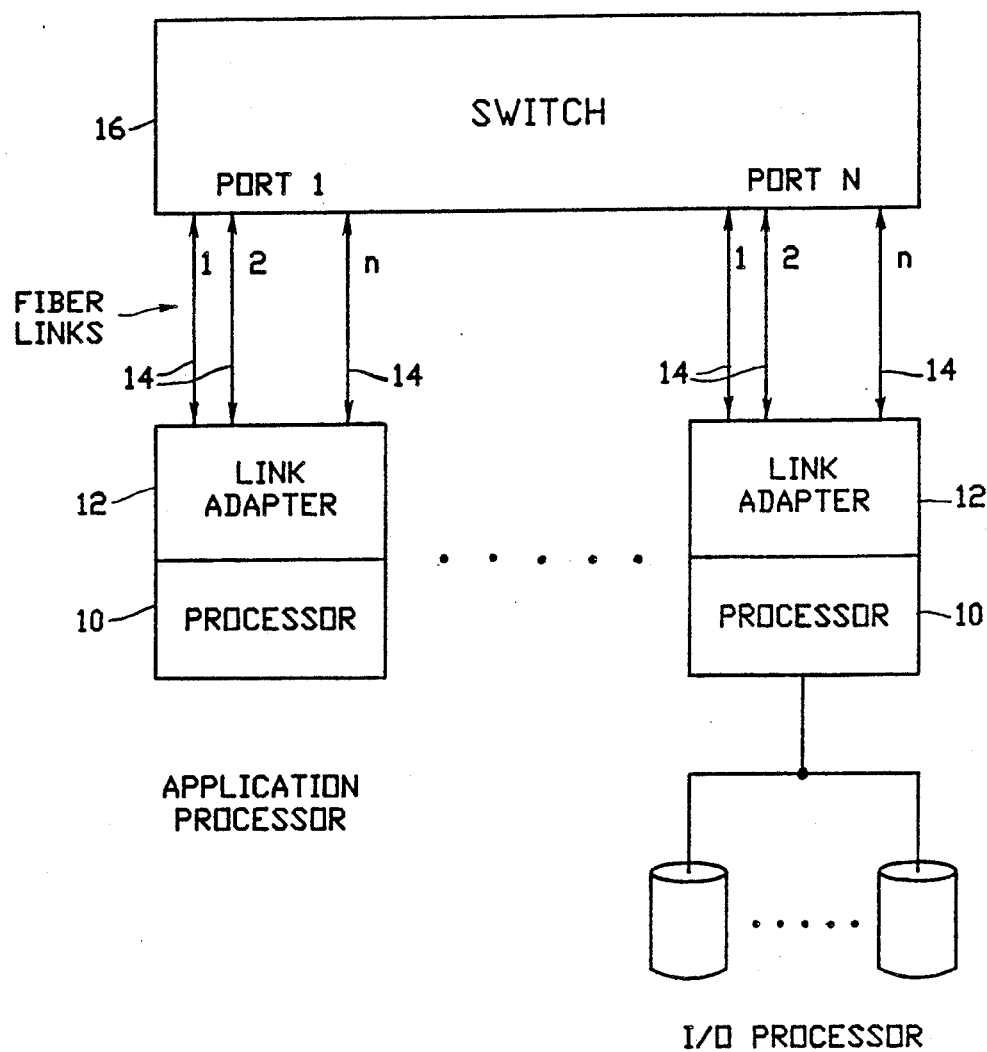
FIG. 1 is a block diagram of a conventional multiprocessor system.
Figure 2:
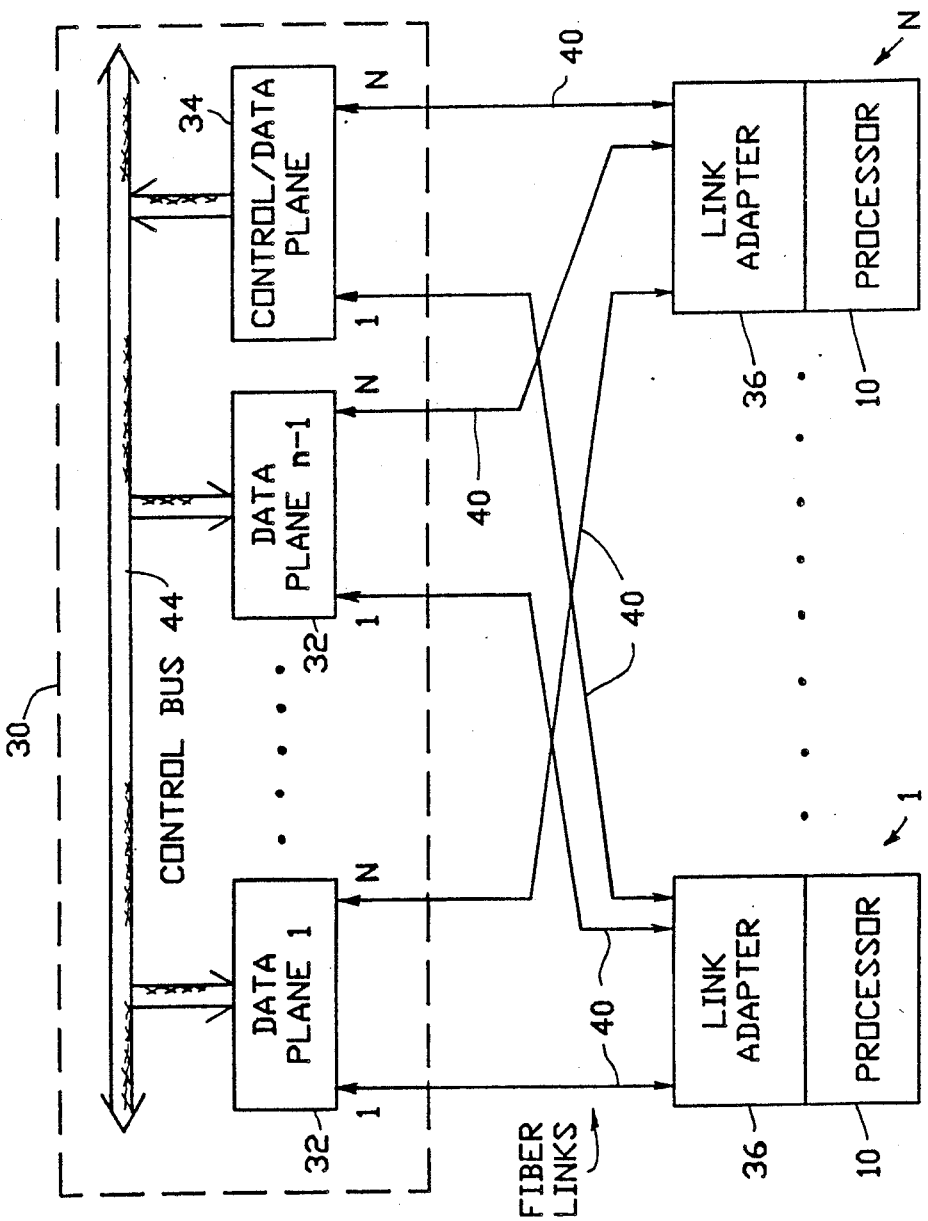
FIG. 2 is a block diagram of a multiprocessor system using the multi-plane crosspoint switch of the invention.

Referring to FIG. 2, the invention is illustrated as a crosspoint switching system 30 which consists of multiple switching planes of crosspoint switches. Each switching plane is one of two different types, i.e., a data plane 32 or a control/data plane 34. The total number of planes is n, out of which k are data planes 32 and n-k are control/data planes 34. At least one control/data plane 34 is required. More than one control/data plane 34 can be provided to increase the reliability and availability of the system, and to increase bandwidth in the message-switched mode of operation, to be described later. For simplicity, the invention will be described with one control/data plane 34 and n-1 data planes 32. The more general case of more than one control/data plane 34 will be treated later.

The multiprocessor complex has N processors 10, or nodes, each connected to the switch 30 by means of n full-duplex links 40. Each full-duplex link 40 is implemented by a pair of fiberoptic links, one for data transfer in each direction. At the switch 30, the set of n full-duplex links associated with a particular processor i will be referred to as Port i. A link adapter 36 attached to each processor 10 provides support for transfer of data between the switch 30 and the memory subsystem of the processor 10. The link adapter 36 is responsible for distributing the transmitted data across the links 40 in a manner to be described later and rearranging the received data for transfer into memory. The link adapter 36 also implements the protocols to initiate, maintain, and terminate a connection through the switch 30.

As shown in FIG. 2, each pair of links 40 is connected to one of the switching planes 32 or to the control/data plane 34 in the switch 30. Each switching plane 32 and the control/data plane 34 contains a full-duplex N×N crosspoint matrix for transfer of data between the N links 40 connected to it. The crosspoint matrix can be a two-sided crosspoint matrix similar to that described in U.S. Pat. No. 4,032,893 by Moran, or a one-sided crosspoint matrix as described by C. J. Georgiou in U.S. Pat. No. 4,605,928. The choice of the type of crosspoint matrix is irrelevant to the invention. The following embodiments of the switching planes 32 and control/data plane 34 assume a two-sided crosspoint matrix. The individual crosspoints in the matrix are set and reset by means of commands sent on a control bus 44. The control of all the switching planes 32 is synchronous. The control bus 44 is driven by the control/data plane 34 which broadcasts commands to set and reset crosspoints to all the data planes 32. The data paths in each plane 32 are independent and asynchronous.

Data Planes 32

Figure 3:
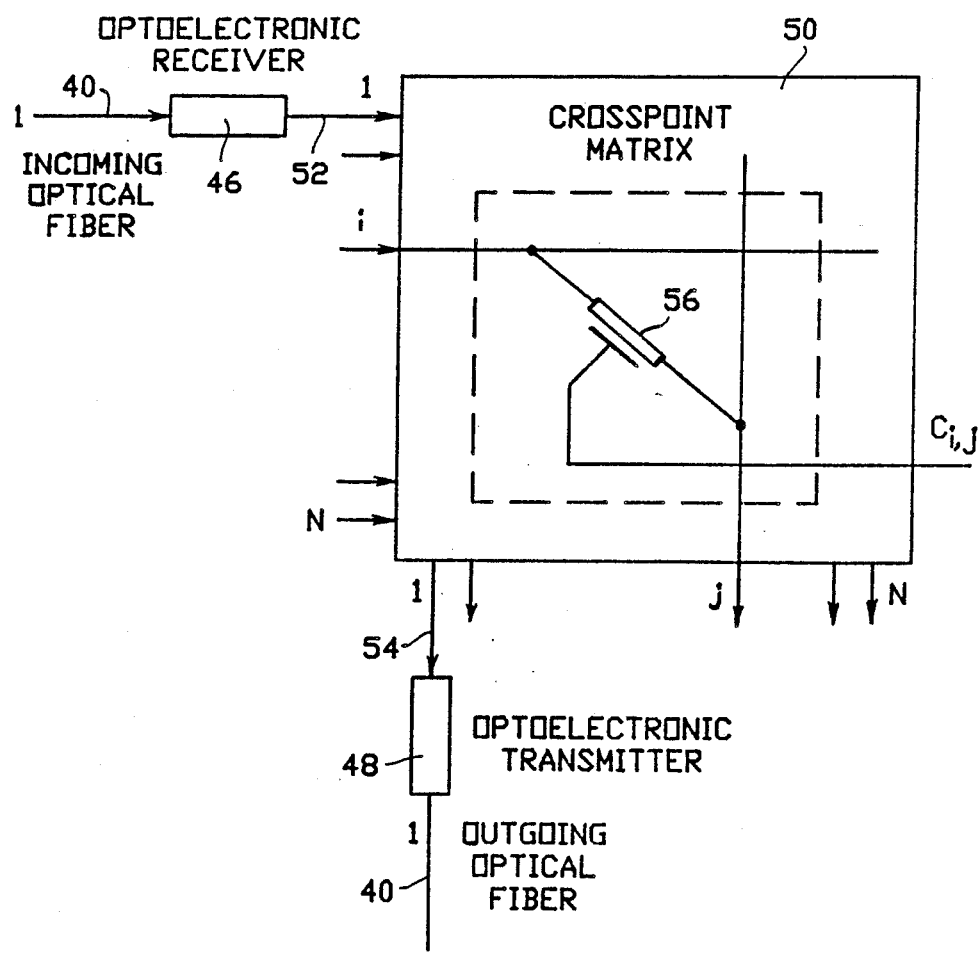
FIG. 3 is a block diagram of a data path in a data plane of the crosspoint switch.

Referring to FIGS. 3, each data plane 32 comprises a crosspoint switching matrix 50 coupled to the N fiber links 40 via a plurality of optoelectronic receivers 46 and a plurality of optoelectronic transmitters 48. Optical pulses arriving on a fiber link 40 are converted into electrical pulses by its optoelectronic receiver 46. The output of the receiver 46 is a serial data stream, usually coded in some form such as the 8/10 code. This data is then passed to the crosspoint matrix 50 without decoding. The crosspoint matrix 50 is organized as N horizontal input lines 52, each corresponding to an incoming fiber link 40, and N vertical output lines 54, corresponding to the N outgoing fiber links 40. Activating the (i,j)th crosspoint establishes a connection between the ith incoming fiber link 40 and jth outgoing fiber link 40. This is achieved by activating a control line Cij to turn on a control gate 56 at the crosspoint (i,j). Since the switch 30 is operated in a full-duplex mode, the crosspoints (i,j) and (j,i) are activated and de-activated simultaneously. The control lines Cij and Cji are therefore tied together. The data appearing at an output line 54 of the crosspoint matrix 50 is converted into optical pulses by its optoelectronic transmitter 48 and coupled into the outgoing fiber link 40.

Figure 4:
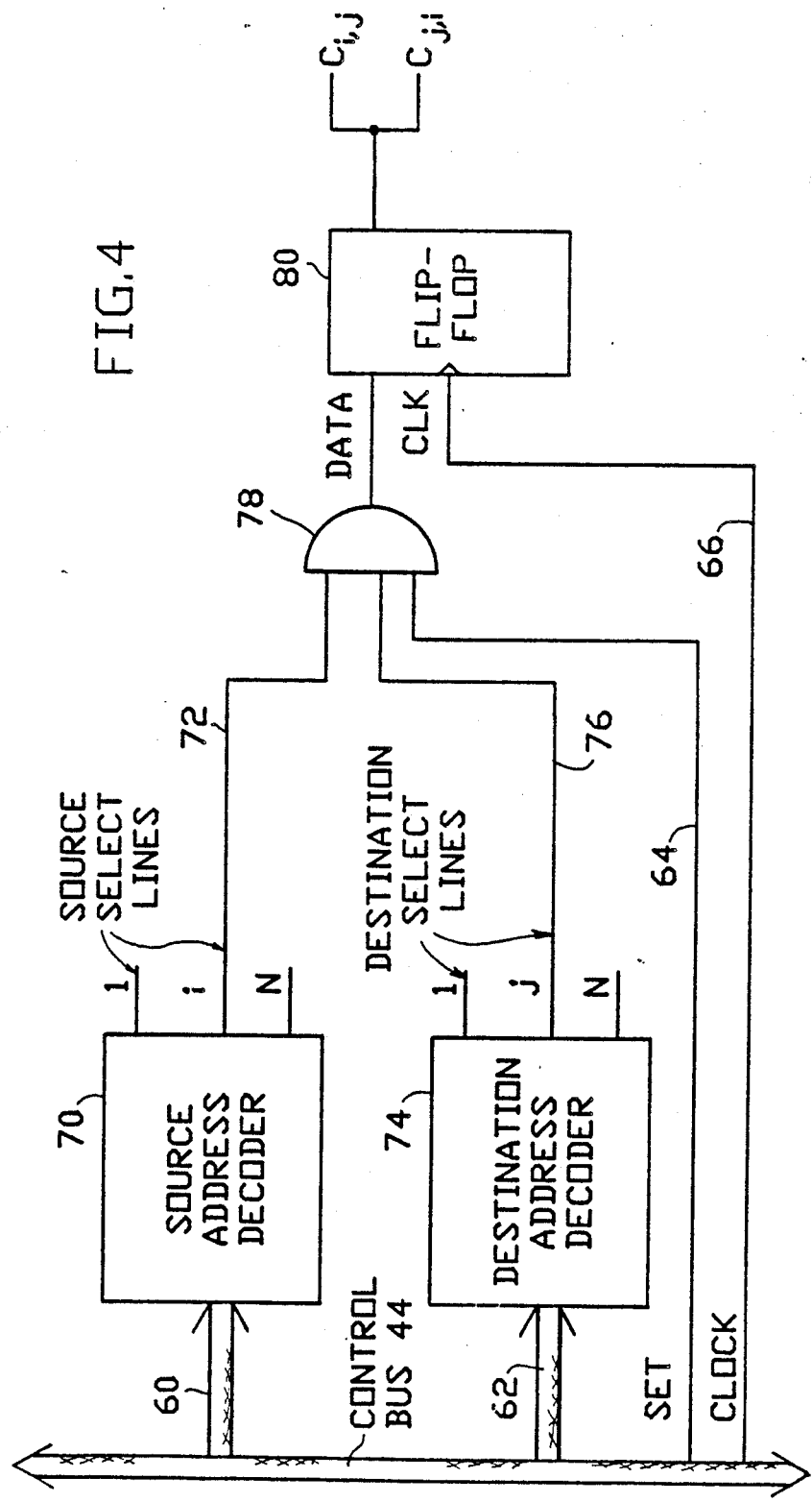
FIG. 4 is a block diagram of a control circuit in a data plane of the crosspoint switch.

As shown in FIG. 4 the control circuitry for setting up the crosspoints in data plane 32 receives commands to set or reset a crosspoint via the control bus 44. The control bus 44 has the following set of lines: (1) a first set of address lines 60 representing the source port to be connected, (2) a second set of address lines 62 representing the destination port to be connected, (3) a line 64 called SET to distinguish between a connect command or disconnect command, and (4) a line 66 called CLOCK signal. Each set of addresses has log N lines to allow any of the N links 40 to be connected. A source address decoder 70 decodes the source address into N source select lines 72. A destination address decoder 74 performs the identical function for the destination address onto lines 76. The simultaneous activation of the source select line 72 designated i and the destination select line 76 designated j indicates that crosspoints (i,j) and (j,i) have been selected. These two signals are combined in an AND gate 78 and used to control a flip-flop 80. The output of the flip-flop 80 drives the control gates 56 (FIG. 3) for crosspoints (i,j) and (j,i). The SET signal 64 from the control bus 44 is used as a third input to the AND gate 78 and the CLOCK signal 66 is the clock for the flip-flop 80. It should be noted that there are only $N^2/2$ AND gates 78 and flip-flops 80 for the $N^2$ crosspoints. This is because control lines Cij and Cji are driven by the same flip-flop 80.

The crosspoints in a data plane 32 are set and reset from the control bus 44 as follows. To establish a connection between two ports i and j, address i is placed as a binary number on the source address lines 60 of the bus 44 and address j on the destination address lines 62. It is noted that interchanging i and j has no effect. The SET line 64 is set to logic 0 for a disconnect command and to logic 1 for a connect command. Activation of the bus CLOCK signal on line 66 then causes the selected crosspoints in the data plane 32 to be set or reset. Since the same signals are received by each data plane 32, the crosspoints in all data planes 32 are set or reset synchronously.

Control/Data Plane 34

Figure 5:
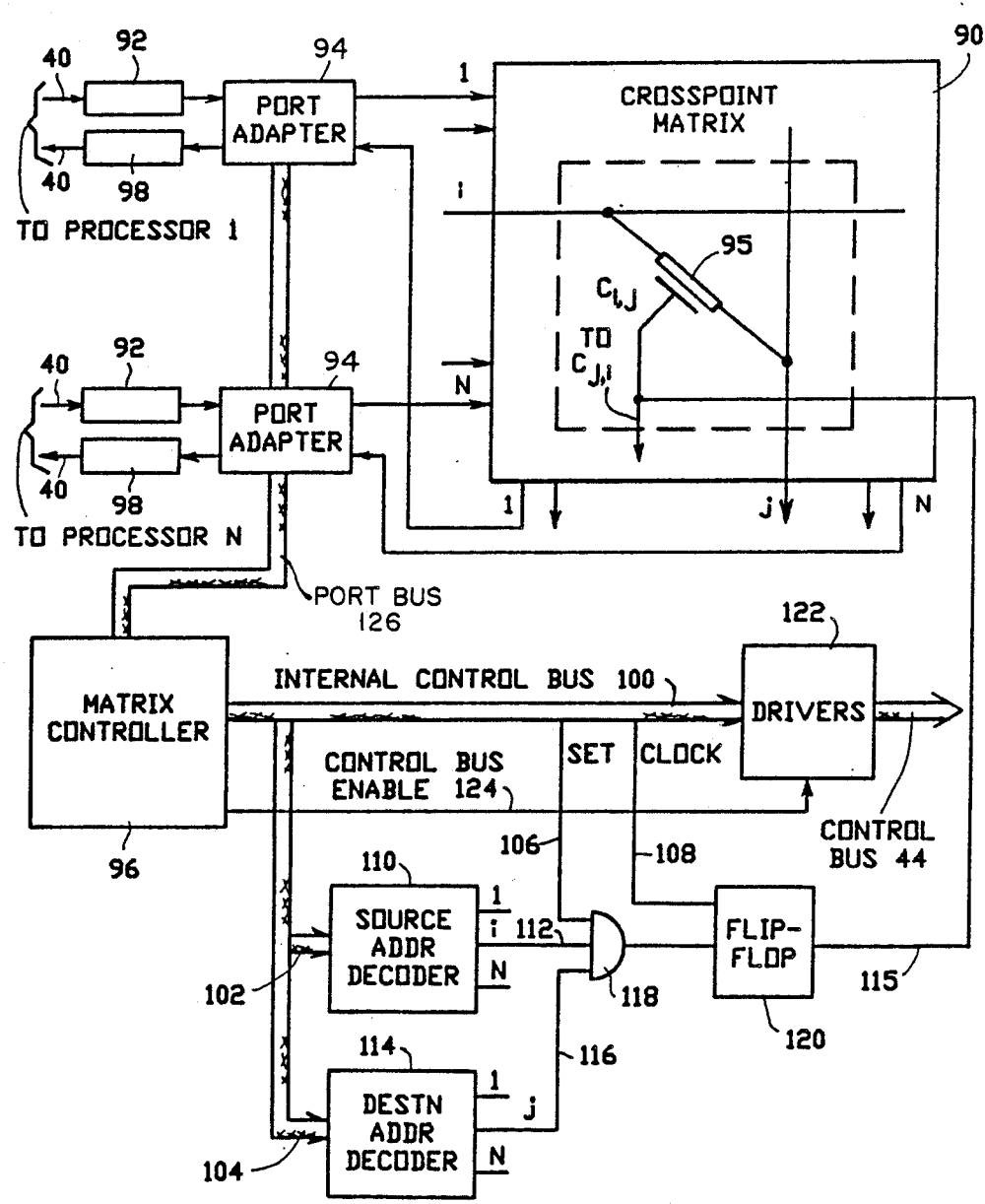
FIG. 5 is a block diagram illustrating the details of a control/data plane of the crosspoint switch.

Referring to FIG. 5, the control/data plane 34 contains a crosspoint matrix 90 identical to the crosspoint matrix 50 of each data plane 32. The incoming data on an optical fiber link 40 associated with a port is first converted into an electrical signal by an optoelectronic receiver 92. This data is then passed onto a port adapter 94. The port adapter 94, to be described in detail later, is responsible for decoding the control information from an incoming message and signaling a matrix controller 96 to perform a connection or disconnection as encoded in the message. The port adapter 94 contains sufficient number of FIFO buffers 132 (FIG. 6) to hold a message while a connection is being made. When a connection is made by setting the appropriate crosspoints in the matrix 90, the port adapter 94 of the source port passes the data from the output of its FIFO buffer 132 through the matrix 90 into the port adapter 94 of the destination port. An optoelectronic transmitter 98 transmits this data to the destination.

The matrix controller 96 receives and processes connect/disconnect requests from the individual ports associated with the processors. Such matrix controllers for crosspoint networks have been described in the art. U.S. Pat. No. 4,630,045 of C. J. Georgiou describes a fast pipelined matrix controller for one-sided crosspoint networks. The matrix controller 96 in this invention maintains a table containing the status of each of the N ports of the switch 30. The status of each port indicates whether the port is currently connected or disconnected and may include additional information such as restricted-access (access from certain ports only), or port unavailable because of a malfunction.

When the matrix controller 96 receives a request for connection from a source port, it examines the status bits of the destination port and determines if the requested connection can be made. If the connection can be made, the matrix controller 96 marks the status of the source and destination ports as "connected", and proceeds to set the crosspoints in the crosspoint matrix 90. The setup of the crosspoint matrix 90 is performed using decoder circuitry in the control/data plane (FIG. 5) which is identical to the decoder circuitry of the data plane 32 (FIG. 4) described earlier. As shown in FIG. 5, an internal control bus 100 extends from matrix controller 96 and includes the following set of lines: (1) A first set of address lines 102 representing the source port to be connected, (2) a second set of address lines 104 representing the destination port to be connected, (3) a SET line 106 to indicate a connect command or a disconnect command, and (4) a CLOCK signal line 108. A source address decoder 110 decodes the source address onto N source select lines 112. A destination address decoder 114 decodes the destination address onto N destination select lines 116. The simultaneous activation of the source select line 112 designated i and the destination select line 116 designated j indicates that crosspoints (i,j) and (j,i) have been selected. These two signals are combined in an AND gate 118 and used to control a flip-flop 120. The output of flip-flop 120 is applied to a control line 115 to drive the control gates 95 (one shown) for crosspoints (i,j) and (j,i). The SET signal on line 106 from control bus 100 is used as a third input to AND gate 118 and the CLOCK signal on line 108 is a CLOCK input for flip-flop 120.

The control bus 44 for the data planes 32 (FIG. 2) described earlier is an extension of the internal control bus 100 from the matrix controller 96. The signals on control bus 44 and internal control bus 100 are identical and perform the same functions. The signals on internal control bus 100 are enabled onto he control bus 44 through a set of bus interface drivers 122 controlled by a control bus enable signal on a line 124 from matrix controller 96. The control bus enable line 124 is activated only if the crosspoints in the data planes 32 must be set up in accordance with those on the control/data plane 34. This is required in the circuit-switched mode of operation to be described later, when use of all the switching planes 32 and the control/data plane 34 is requested for transfer of a message. After activating the crosspoints, matrix controller 96 sends an enable signal via a port bus 126 to both the source and destination port adapters 94 to begin transfer of data through the crosspoint matrix 90. If the matrix controller 96 finds that the requested connection cannot be made, for example, because the destination port is connected to some other port, then port adapter 94 of the requesting port is informed of this condition. The port adapter 94 then sends a "reject" message on the outgoing link 40 to inform the requesting processor 10 that the requested connection cannot be made.

Figure 6:
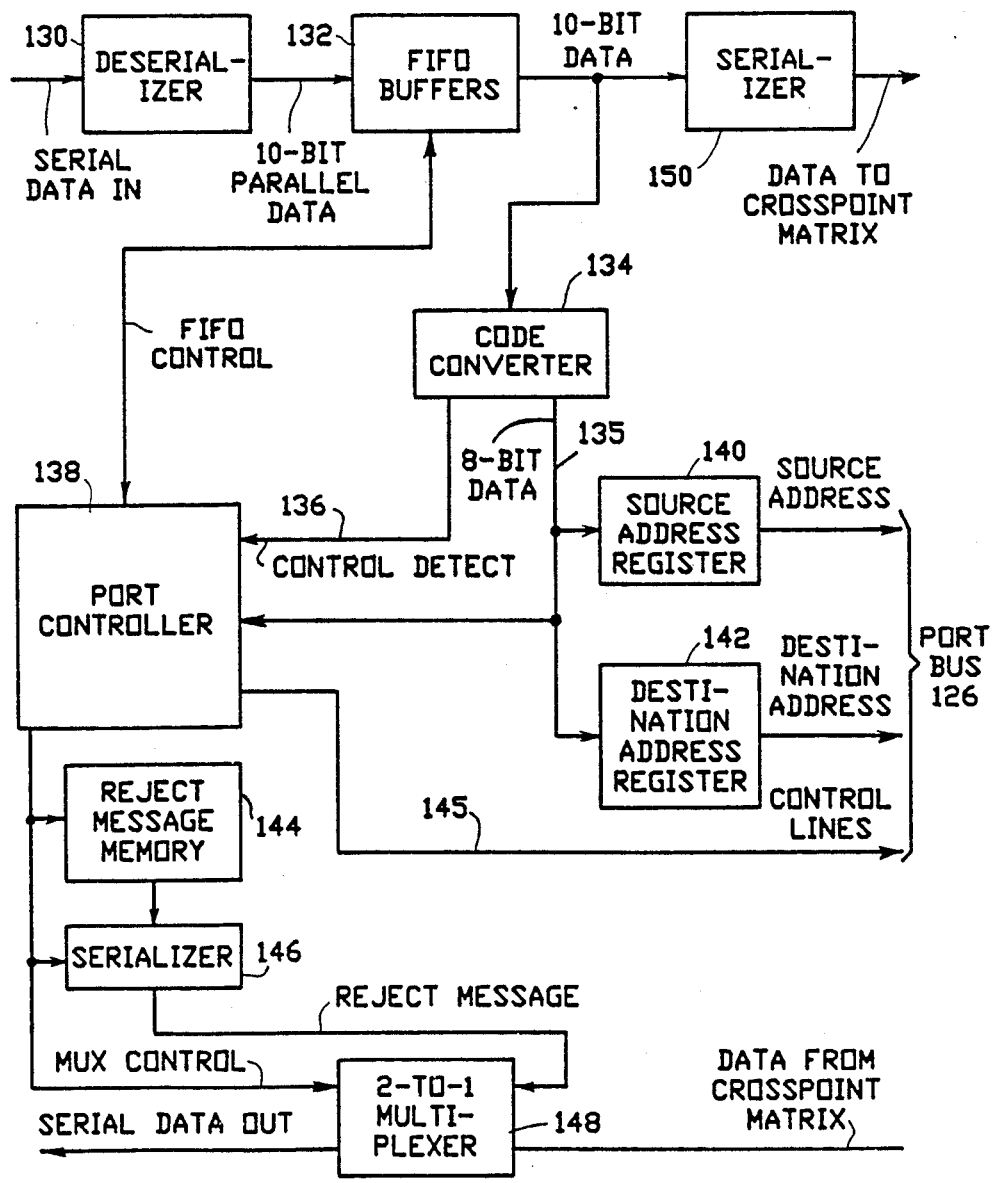
FIG. 6 is a block diagram of a port adapter of the cross-point switch.

The port adapter 94 is shown in more detail in FIG. 6. The incoming serial stream of data bits is first converted into 10-bit parallel characters by a deserializer 130. Each 10-bit data appearing at the output of the deserializer 130 represents a character coded in 8/10 code. This data is then buffered by a FIFO buffer 132. Each word of the buffer 132 is 10 bits wide. The storage capacity of the buffer 132 should be at least equal to the length of the longest message sent in the message-switched mode of operation, a typical number being 256 words. A code converter 134 converts the data appearing at the output of the FIFO buffer 132 into 8-bit characters which appear at an output 135. The code converter 134 also detects the special characters used for control purposes and activates a "control detect" line 136 when such a character is detected.

When a control character indicating the start of a message is detected at output 135 of the code converter 134 by the port controller 138, the port controller 138 performs a number of actions. First, it latches the two bytes following the control character, which represent source and destination addresses, into the source address register 140 and destination register 142, respectively. The port controller 138 then sends a request for connection via the port bus 126 to the matrix controller 96. The request sent by port bus 126 contains the source and destination addresses from registers 140 and 142 to be connected and the control signals from port controller 138 on control lines 145. If a negative reply is obtained from the matrix controller 96, i.e., the request is disallowed, then a "reject" response message is sent back to the requesting processor 10 over the outgoing link 40. This response message is permanently stored in a memory 144 in each port adapter 94, so that the matrix controller 96 is relieved of the burden of generating such messages. The message is stored in parallel and encoded form, which is converted by a serializer shift register 146 into a serial data stream before passing on to the link 40.

If the port controller 138 receives a positive response to a connection request form the matrix controller 96, it then allows the subsequent parts of the message waiting in the buffer 132 to proceed to the crosspoint matrix 90. A serializer shift register 150 connected to the output of the FIFO buffer 132 re-converts the data into serial form so that it can be handled by the one-bit wide path in the crosspoint matrix 90. The crosspoint matrix 90 switches the data into the destination adapter 94 where it is coupled into the outgoing link 40. A two-to-one multiplexer 148 allows the outgoing link 40 to be driven from one of two sources, either the message switched through the crosspoint matrix 90, or the reject message generated locally.

Two distinct control characters are used at the start of a message to distinguish between the two modes of operation of the switch 30 (FIG. 2) which will be described later. In the message-switched mode of operation, only the crosspoint matrix 90 (FIG. 5) in the control/data plane 34 is enabled. In the circuit-switched mode of operation, all of the switching planes 32 as well as the control/data plane 34 are enabled. This is achieved by selectively activating the control bus enable signal 124 by the matrix controller 96 depending on the control character received.

Referring to FIGS. 5 and 6, the port bus 126 provides the means of communication between the port controllers 138 of the individual ports and the matrix controller 96. The port bus 126 can be implemented in several possible ways. When the number of ports is small, e.g., not more than sixteen, a dedicated pair of request/response lines can be provided for each port. The matrix controller 96 polls each of the request lines in succession and services those ports with a pending request. The order in which the ports are serviced depends on the servicing scheme used. Some possible schemes are fixed-priority, round-robin, and rotating priority. If the number of ports is large, it is impractical to provide a pair of dedicated lines for each port. One possible way to handle this situation is to partition the ports into groups and provide one pair of lines for each group. For example, in a 64-port switch, the ports can be partitioned into eight groups of eight ports each. The requests originating in a given port group compete against each other for access to the request/response pair of lines for that group. In the case of such contention, the winning request is selected by a priority circuit. In addition to the request/response lines, a set of address lines is provided for transfer of address and other control information between a port adapter 94 and the matrix controller 96. The address lines are shared by all the port adapters 94 and only the port adapter that is being serviced at a given time is allowed access to the lines at that time.

Message Composition

A message sent from a processor 10 in the system to another processor through the switch 30 consists of one or more frames of characters. Each frame is delimited by special control characters with the beginning of the frame marked by a first control character and the end of the frame indicated by a second control character. Each processor continuously transmits a special character called an idle character during the interval between frames. Therefore, at any time, an outgoing link 40 from the processor 10 carries either a message frame or a stream of idle characters.

FIG. 7A shows the composition of a message frame 160 including three parts, a header 162, an information field 164, and a trailer 166. The header field 162 and trailer field 164 are present in every frame 160, whereas the information field 164 may not be present in certain frames called control frames. The information field 164 contains the actual data or message to be delivered to the destination. The header field 162 and the trailer field 166 are provided to enable routing of the frame 160 to the desired destination as well as for providing certain control information to the switch 30. The header and trailer fields 162 and 166 also aid in checking the validity of the information received at the destination by providing some means for detection of errors during transmission.

As shown in FIG. 7B, the header 162 of message frame 160 is further composed of three individual fields. The first character 170 is a control character, to be called the Start-of-Frame or SOF character, that delimits message frame 160 from the preceding stream of idle characters. Different SOF characters 170 are used to distinguish various types of frames 160, to be described in detail later. The SOF character 170 is followed by two characters 172 and 174 representing the source and destination addresses of message 160, respectively. Additional fields in the header 162 can be used to indicate the framelength and to implement more control functions, but these are not crucial to the invention and will not be described.

As shown in FIG. 7C, the trailer 166 of message frame 160 is composed of two fields, a CRC field 176 and an End-of-Frame (EOF) delimiter 178 The CRC field 170 is used by the sender of the frame 160 to record a cyclic redundancy code for the data in the information field 164. This is later compared by the receiving processor against a locally-generated CRC to check for errors during transmission of the message 160. Such CRC checking is common in communication systems. The EOF delimiter 178 is a special control character that indicates the end of the frame 160 by delimiting it from the succeeding stream of idle characters.

Three distinct SOF characters are used to distinguish between various frame types.

(1) A Connect delimiter for the message-switched mode of operation (CSOF1).

(2) A Connect delimiter for the circuit-switched mode of operation (CSOF2).

(3) A passive delimiter (PSOF).

Similarly, two distinct EOF characters are used to distinguish between various frame types.

(1) A passive delimiter (PEOF).

(2) A disconnect delimiter (DEOF).

A frame starting with one of the two connect SOF delimiters and ending with the PEOF delimiter is called a Connect-Passive frame. Two types of connect-passive frames are possible, depending on whether CSOF1 or CSOF2 is used as the starting delimiter. Similarly, a Connect-Disconnect frame is a frame starting with either CSOF1 of CSOF2 and ending with the DEOF character. A Passive-Passive frame is one beginning with PSOF and ending with PEOF. Lastly, a Passive-Disconnect frame is one beginning with the PSOF character and ending with the DEOF.

A control frame is a message frame in which the information field 164 has length zero, i.e., the header field 162 is immediately followed by the trailer field 166. The delimiters of the frame can be any of the valid control characters described above. Such frames are useful for implementation of the communication protocol for the circuit-switched mode of operation, to be described later.

As described earlier, a message sent from a processor 10 consists of one or more frames 160. The following are the ways in which a valid message can be composed:

(1) A single connect-disconnect frame.

(2) A connect-passive frame followed by a passive-disconnect frame.

(3) A connect-passive frame followed by one of more passive-passive frames and ending with a passive-disconnect frame.

The above composition ensures that a message always starts with one of the two Connect SOF delimiters and ends with the DEOF delimiter. The port adapter 94, as described earlier, is designed to set up a connection on receipt of a SOF delimiter and reset the connection on receipt of the DEOF delimiter. The passive delimiters do not affect the connection already set up.

Modes of Operation

One of the most important features of the invention is that the switching system supports two modes of operation, one suitable for short messages, and the other for long messages. The two modes are called circuit-switched and message-switched. Any given message can be sent using either mode of operation independent of other messages and independent of the mode of operation used by other communicating processors at that time. A description of the two modes of operation follows in the context of sending a message from processor A to processor B.

In the message-switched mode of operation, only the control/data plane 34 and its associated links 40 participate in the transfer of the message and the remaining links of the two communicating processors may stay idle. The message to be sent by the source processor A is constructed from one or more frames 160 in one of the three valid combinations of frames described earlier. The starting delimiter 170 of the first frame is the SOF1 character and the ending delimiter 178 of the last frame is the EOF character. The length of any frame 160 should not exceed the capacity of the FIFO buffer 132 in the port adapter 94.

On receipt of the header 162 of the first frame 160 from processor A, the port adapter 94 in the control/data plane 34 requests a connection to the matrix controller 96 and the connection is set up as described previously. The matrix controller 96 deactivates the control bus enable signal 124 during the set-up process and inhibits the set-up command from being broadcast to the data planes 32. The link adapter 36 of the source processor A routes the message on the link 40 connected to the control/data plane 34 and the remaining links 40 are left idle. The link adapter 12 of the receiving processor B recognizes the message-switched mode of operation from the CSOF1 character of the first frame of the message which is passed on by the switch 30. It then transfers the data received from the control/data plane 34 into the memory subsystem of the processor B.

The second mode of operation is the circuit-switched mode. In this mode, a message is sent as follows. The source processor A first sends a control frame to the control/data plane 34 specifying processor B as the destination address. This control frame is a Connect-Passive frame with the CSOF2 delimiter. On receipt of the CSOF2 delimiter, the port adapter 94 recognizes the circuit-switched mode of operation. It first checks to see if the port connected to processor B is busy. If so, a reject message is sent back to processor A from the control/data plane 34. On receipt of the reject message, processor A terminates the transaction. It may make another attempt later using the same steps. If the port adapter 94 finds processor B not busy, the transfer of the message proceeds as follows:

(1) The port adapter 94 sets up the matrix crosspoints as described earlier. The control bus enable line 124 is activated by the matrix controller 96 resulting in the set-up commands to be broadcast to all the data planes 32 on control bus 44. This allows data to be distributed across all the n links 40.

(2) The port adapter 94 transmits the control frame received from processor A to processor B via the crosspoint matrix 90 of the control/data plane 34. On receipt of the control frame, the link adapter 36 of processor B recognizes the circuit-switched mode of operation and prepares to receive data on all of its incoming links 40. The link adapter 12 is provided with the buffers and hardware necessary to convert the incoming data on n links 40 to a single data stream.

(3) After sending the initial control frame, processor A waits for a certain interval of time in anticipation of the reject message. This time interval is set as the worst case round-trip propagation delay between the processor A and the switch 30 plus the maximum amount of time taken by the port adapter 94 and matrix controller 96 to complete all of the actions required to send the reject frame after receipt of the control frame from processor A. If a reject frame is not received during this period, processor A assumes that the connection has been set up successfully. It then sends the message by distributing the data uniformly over all the n links 40. The data sent on each link 40 can be organized as a single frame or multiple frames. Each frame is a Passive-Passive frame.

(4) The link adapter 36 of processor B receives the data on all of its n incoming links 40 and transfers the data into memory as a single data stream.

(5) On completion of transmission of the message, the link adapter 36 of processor A sends a control frame to the control/data plane 34 of the switch 30 with delimiting characters PSOF and DEOF. On receipt of the DEOF character, the port controller 138 first relays this frame to processor B and then proceeds to disconnect processors A and B by resetting the crosspoints between the two processors. The disconnect command from the matrix controller 96 is broadcast to all of the data planes 32 via control bus 44, thus freeing all n links 40 of both processors A and B for a new connection.

(6) The link adapter 12 of processor B identifies the end of the message on receipt of the control frame relayed by the switch and terminates the session.

Thus, the invention provides the flexibility of selecting one of the two modes of operation for every message sent through the switch 30. The choice of the mode should be made to maximize performance, i.e., to minimize the total communication time for the specific message. Thus, the message-switched mode is used for short messages and the circuit-switched mode is used for long messages. Th distinction between long and short messages depends on the length of the fiber links 40, the bandwidth of each switching plane 32, and the number of switching planes 32 in the system. For illustration, consider a system with n=8 switching planes (including data planes 32 and control/data plane 34), each operating at 1 gigabits/second. Assume further that each fiber link 40 is 200 meters long, thereby introducing a round trip propagation delay of approximately 2 microseconds. Also, consider a message 160 with a length of 128 bytes, ignoring the overhead introduced by coding and other factors. In the message-switched mode of operation, the 128 byte message 160 would take a transmission time of 1.024 microseconds. This improves to 128 nanoseconds in the circuit-switched mode of operation because of the use of all the eight links. However, an additional 2 microseconds is spent in establishing the connection in the circuit-switched mode. Therefore, the total communication time in the circuit-switched mode is nearly twice that in the message-switched mode. In contrast, a 4096 byte long message would take a total communication time of 32.768 microseconds in the message-switched mode and 4.096+2=6.096 microseconds in the circuit-switched mode. Hence, the circuit-switched mode is the obvious choice under these circumstances.

If the distance between the processors 10 and the switch 30 is large, which is possible in a large multiprocessing complex, the propagation delay in the fiber links 40 becomes significant. The use of the message-switching mode for short messages is even more attractive in such an environment.

Use of Multiple Control/Data Planes

The invention has been described with respect to a single control/data plane 34. However, the architecture supports multiple control/data planes 34 for increased reliability and availability.

One advantage of having multiple data planes 32 is that some of the data planes 32 and/or the associated communication links 40 can be faulty and the system can still continue to operate by using the remaining data planes 32. The control/data plane 34 becomes a single point of failure. The use of multiple control/data planes 34 overcomes this problem.

In general, the system can be constructed with k control/data planes 34 and n-k data planes 32. At any time only one of the control/data planes 34, called the active control/data plane, performs the control functions. The remaining control/data planes 34, called passive control/data planes, serve simply as data planes in which the control functions are disabled. In the event of a fault in the active control/data plane 34 that threatens disruption of system operation, its function is taken over by one of the passive control/data planes. Thus, the effect will be similar to the loss of a data plane 32, which causes only a degradation in bandwidth.

Having thus described our invention, what we claim as new and desire to secure by Letters Patent is as follows:

1. A switching system for selectively connecting a plurality of processors, comprising:
   a switching station comprising a plurality of switching planes for transferring data therethrough;
   a plurality of data links, each of said data links being coupled at a first end thereof to a respective one of said switching planes and at a second end thereof to one of said processors;
   at least one of said switching planes being a control/data plane including control means for controlling the transfer therethrough of data and for controlling data transfer through other of said switching planes; and
   said switching station being operable in a first mode wherein only said one switching plane is used for data transfer and in a second mode wherein said one switching plane and said other switching planes are used for data transfer.

2. The switching system of claim 1, wherein each of said switching planes comprises a crosspoint switching matrix.

3. The switching system of claim 2, wherein said one switching plane includes a matrix controller for controlling the connection and disconnection of the data paths in said crosspoint switching matrix of each switching plane.

4. The switching system of claim 3, wherein said one switching plane includes means for connecting said matrix controller only to said one switching plane in said first mode and for connecting said matrix controller to all of said switching planes in said second mode.

5. The switching system of claim 1, wherein said one switching plane includes means responsive to incoming messages on said data links for determining the source and destination of the data.

6. The switching system of claim 1, wherein said one switching plane includes means responsive to incoming messages on said data links for selecting the first or second mode of operation for said switching station.

7. A switching system for controlling the data transfer between a plurality of processors, comprising:
a switching station comprising a plurality of switching planes for transferring data therethrough, said switching planes comprising a plurality of data planes and at least one control/data plane;
a plurality of data links, each of said data links being coupled at a first end thereof to a respective one of said switching planes and at a second end thereof to one of said processors;
said control/data plane including control means for selecting the data paths therethrough and for selecting the data paths through said data planes to transfer data between said processors; and
said switching station being operable in a first, message-switched mode wherein only data paths in said control/data plane are used for transfer of data and in a second, circuit-switched mode wherein the data paths in said control/data plane and said data planes are used for transfer of data.

8. The switching system of claim 7, wherein said control means of said control/data plane includes adapter means for detecting control information from incoming messages on said data links to determine the source and destination of the messages.

9. The switching system of claim 8, wherein each of said data planes and said control/data plane comprises a crosspoint switching matrix.

10. The switching system of claim 9, wherein said control means of said control/data plane includes a matrix controller coupled to said adapter means for controlling the connection and disconnection of the data paths in said data planes and in said control/data plane.

11. The switching system of claim 10, wherein said control/data plane includes decoder means coupled to said matrix controller for selectively connecting and disconnecting the data paths in said crosspoint switching matrix of said control/data plane.

12. The switching system of claim 11, wherein each of said data planes includes decoder means coupled to said matrix controller of said control/data plane for selectively connecting and disconnecting the data paths in said crosspoint switching matrix of each data plane.

13. The switching system of claim 12, wherein said control/data plane includes enable means for connecting said matrix controller to said data planes in said circuit-switched mode and for disconnecting said matrix controller from said data planes in said message-switched mode.

14. The switching system of claim 7, wherein said switching station includes one or more additional control/data planes.

15. The switching system of claim 7, wherein said switching station is operated in said message-switched mode for short messages and in said circuit-switched mode for long messages.

16. The switching system of claim 7, wherein said control/data plane includes means for detecting control information from incoming messages on said data links to determine whether said switching station is to be operated in said message-switched mode or in said circuit-switched mode.

* * * * *